United States Patent
Smith et al.

(10) Patent No.: US 10,982,759 B2
(45) Date of Patent: Apr. 20, 2021

(54) SHIFT LEVER RETENTION APPARATUS

(71) Applicant: Honda Motor Co., Ltd., Tokyo (JP)

(72) Inventors: Shane R. Smith, Zanesfield, OH (US); Jason W. Grundey, Wapakoneta, OH (US); Scott D. Batdorf, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 15/714,334

(22) Filed: Sep. 25, 2017

(65) Prior Publication Data

US 2019/0093763 A1    Mar. 28, 2019

(51) Int. Cl.

| F16H 61/24 | (2006.01) |
| F16H 59/10 | (2006.01) |
| F16H 61/36 | (2006.01) |
| F16H 61/18 | (2006.01) |
| F16H 59/02 | (2006.01) |

(52) U.S. Cl.
CPC ......... *F16H 61/24* (2013.01); *F16H 59/0278* (2013.01); *F16H 59/10* (2013.01); *F16H 61/18* (2013.01); *F16H 61/36* (2013.01); *F16H 2059/0282* (2013.01); *F16H 2061/242* (2013.01); *F16H 2061/247* (2013.01)

(58) Field of Classification Search
CPC ...... F16H 61/24; F16H 59/0278; F16H 61/18; F16H 61/36; F16H 59/10; F16H 2059/0282; F16H 2061/247; F16H 2061/242; F16H 2059/0273

USPC .............. 74/473.26, 473.28, 473.35
See application file for complete search history.

(56) References Cited

U.S. PATENT DOCUMENTS

| 3,082,639 | A | * | 3/1963 | Almquist, Jr. | ........ F16H 59/042 |
| | | | | | 74/473.33 |
| 3,496,797 | A | * | 2/1970 | Maina | ..................... F16H 61/18 |
| | | | | | 74/473.21 |
| 4,282,768 | A | | 8/1981 | Osborn | |
| 5,150,633 | A | | 9/1992 | Hillgartner | |
| 5,289,734 | A | | 3/1994 | Parsons | |
| 5,406,860 | A | | 4/1995 | Easton et al. | |
| 5,655,411 | A | * | 8/1997 | Avitan | ................... G05G 9/047 |
| | | | | | 74/471 XY |
| 6,029,537 | A | * | 2/2000 | Nagao | ................... F16H 59/044 |
| | | | | | 74/473.33 |
| 6,128,971 | A | * | 10/2000 | Papasideris | ............ G05G 9/047 |
| | | | | | 74/471 R |

(Continued)

FOREIGN PATENT DOCUMENTS

| CN | 101028794 A | 9/2007 |
| DE | 19935874 A1 | 2/2001 |

(Continued)

*Primary Examiner* — Victor L Macarthur
(74) *Attorney, Agent, or Firm* — American Honda Motor Co., Inc.; Clifford B Vaterlaus

(57) ABSTRACT

A gear shift lever biasing apparatus includes a shift lever biased primarily along a first dimension axis using a spring. The shift lever is retained to a backing plate, which may be mounted on a frame. A contact area on the backing plate engages with a bumper that is secured to the frame with a semi-rigid retainer, thereby providing bias to the gated shift lever primarily along a second dimension axis that is primarily orthogonal to the first dimension axis.

9 Claims, 5 Drawing Sheets

(56) References Cited

U.S. PATENT DOCUMENTS 6,644,142 B2 * 11/2003 Junge .................. F16H 59/0204
                                                                                                 74/473.18
6,786,108 B2    9/2004  Luh
9,316,304 B2    4/2016  Park et al.

FOREIGN PATENT DOCUMENTS

EP        0624741 A1    11/1994
EP        2905512 A1    8/2015

* cited by examiner

SHIFT LEVER RETENTION APPARATUS

BACKGROUND

Gear shift levers for vehicles typically move between detent positions in the gear shift plate. Each detent resting position typically includes some free play for the shift lever which may allow unintended movement of the shift lever.

Gear shifts typically utilize a mechanical interlock system to prevent inadvertent changes to the position of a gear shift lever (e.g., due to being bumped while the vehicle is in park, or jolted out of position while the vehicle is moving). Some of these mechanisms require a secondary input to release the interlock mechanism. Others use gear shift detention mechanisms that are within the vehicle's transmission assembly.

Various interlock mechanisms have been proposed or utilized, including the use of a spring to bias a shift lever, and a rubber bumper for a shift lever. However, these techniques suffer various deficiencies, including that the resistance induced in the gear shift lever may not be consistent, smooth, and secure in all gear shift lever positions.

BRIEF SUMMARY

A gear shift lever biasing assembly is disclosed to apply a multi-axis pre-load to a gear shift lever in at least one gated gear positions. This pre-load biases the shift lever to stay in the gated position(s) thus discouraging the shifted lever from moving unintentionally.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Terms used herein have their ordinary meaning in the relevant art, unless otherwise indicated or expressly defined.

"Rearward direction" refers to a direction toward the back of a vehicle.

"Lateral direction" refers to a direction substantially orthogonal to the rearward direction (e.g., leftward or rightward).

"Substantially orthogonal" refers to more orthogonal than not, i.e. less than 45 degrees different from orthogonal.

One embodiment of a gear shift lever biasing apparatus is disclosed that includes a backing plate coupled to an endpiece of a gear shift lever. A spring is used to bias the gear shift lever primarily along a first dimension axis (a lateral direction, typically leftward) at a gear stop position in a gated shift lever plate. A contact area on the backing plate (which may be part of the endpiece or the backing plate or a separate part) engages a bumper separate from (not coupled to) the backing plate to bias the gear shift lever primarily along a second dimension axis that is substantially orthogonal to the first dimension axis (typically, a rearward direction in the gated shift lever plate).

In one embodiment, a first end of the spring is tension fit to the backing plate and a second end of the spring is tension fit to the gear shift lever. The backing plate may include a bracket, with the endpiece of the gear shift lever rotationally mounted in the bracket. The endpiece may be attached to the backing plate with a bolt that may form the contact area of the backing plate. Typical materials for the bumper are rubber, plastic, or metal (rubber may be preferred due to its resilient properties)

The backing plate may typically include an attachment area (e.g., a bolt or pin hole) for a gear shift cable and an attachment area for rotational mounting (e.g., a bolt or pin hole) to a vehicle frame.

The bumper may be secured to the frame of a vehicle with a semi-rigid retainer (e.g., a metallic or plastic buttress) in a position to engage the contact area of the backing plate when the gated shift lever is placed into a particular gated position (e.g., Park), thereby providing, in the particular gated position, bias to the gated shift lever primarily along both the second dimension axis that is substantially orthogonal to the first dimension axis. This creates a desirable user feel in the gear shift lever, and better secures it in the particular gated position.

Such a biasing apparatus may be particularly useful in off-road and All Terrain Vehicles (ATVs) to retain the shift lever in the "Park" position. Off-road and ATV vehicles are often parked on steep slopes, and the biasing apparatus may be used to prevent the lever from inadvertently slipping or being bumped out of Park.

Figure 1:
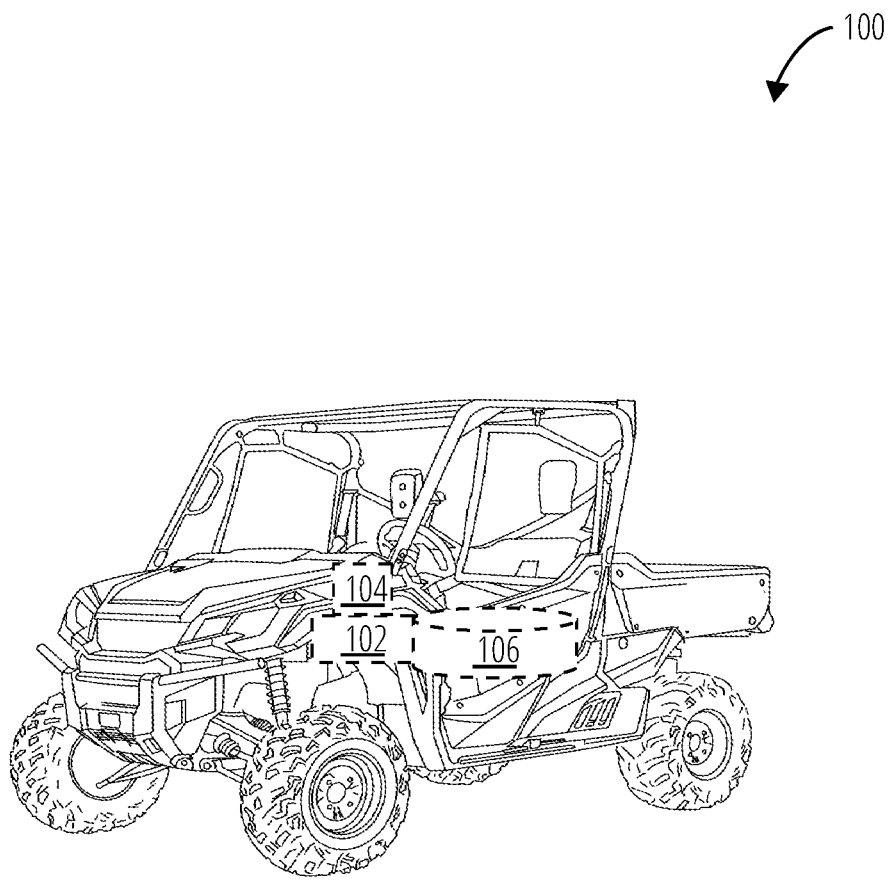
FIG. 1 illustrates an off-road vehicle 100 in accordance with one embodiment.
Figure 2:
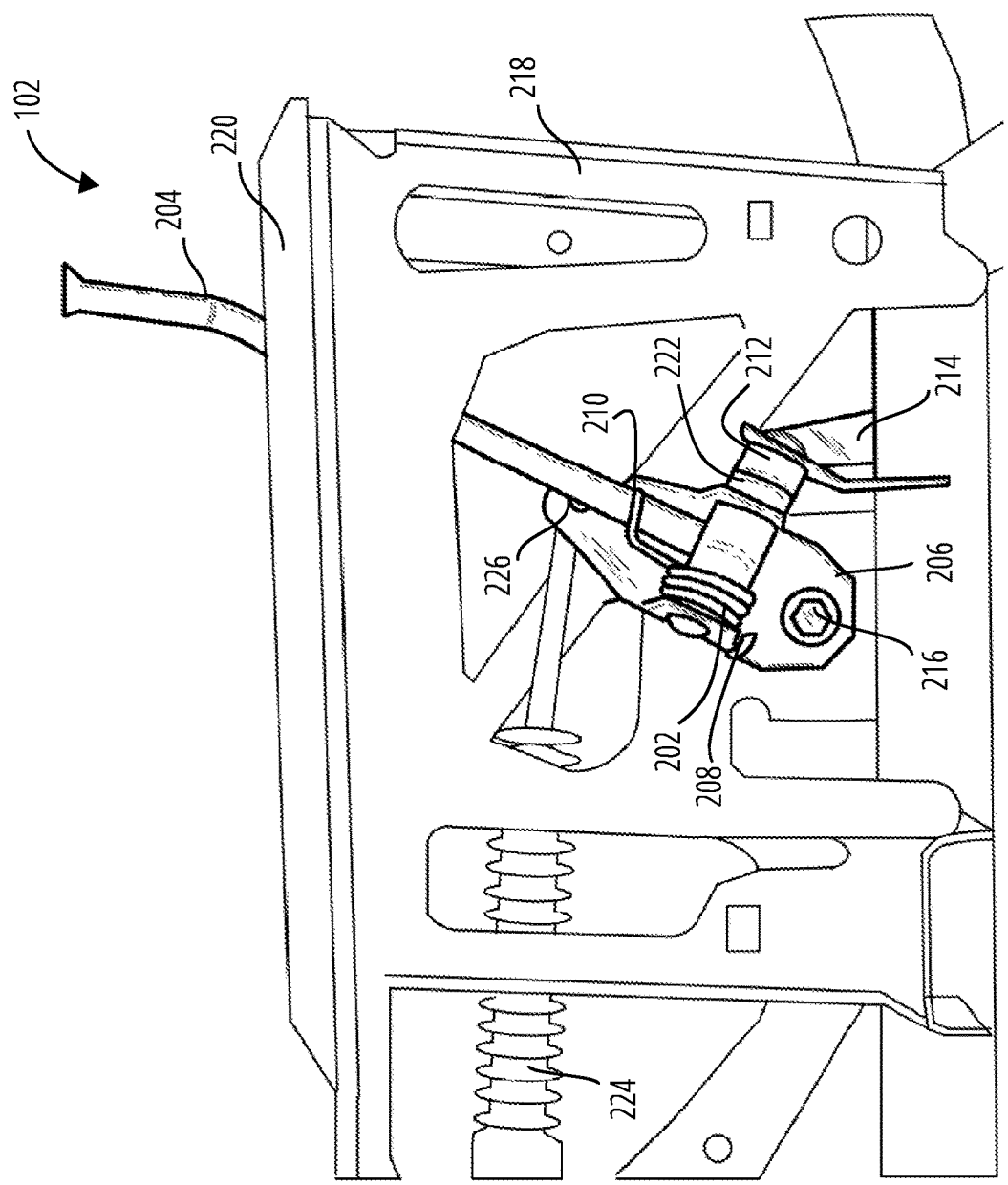
FIG. 2 illustrates a side view of a shift lever assembly 102 in accordance with one embodiment.
Figure 3:
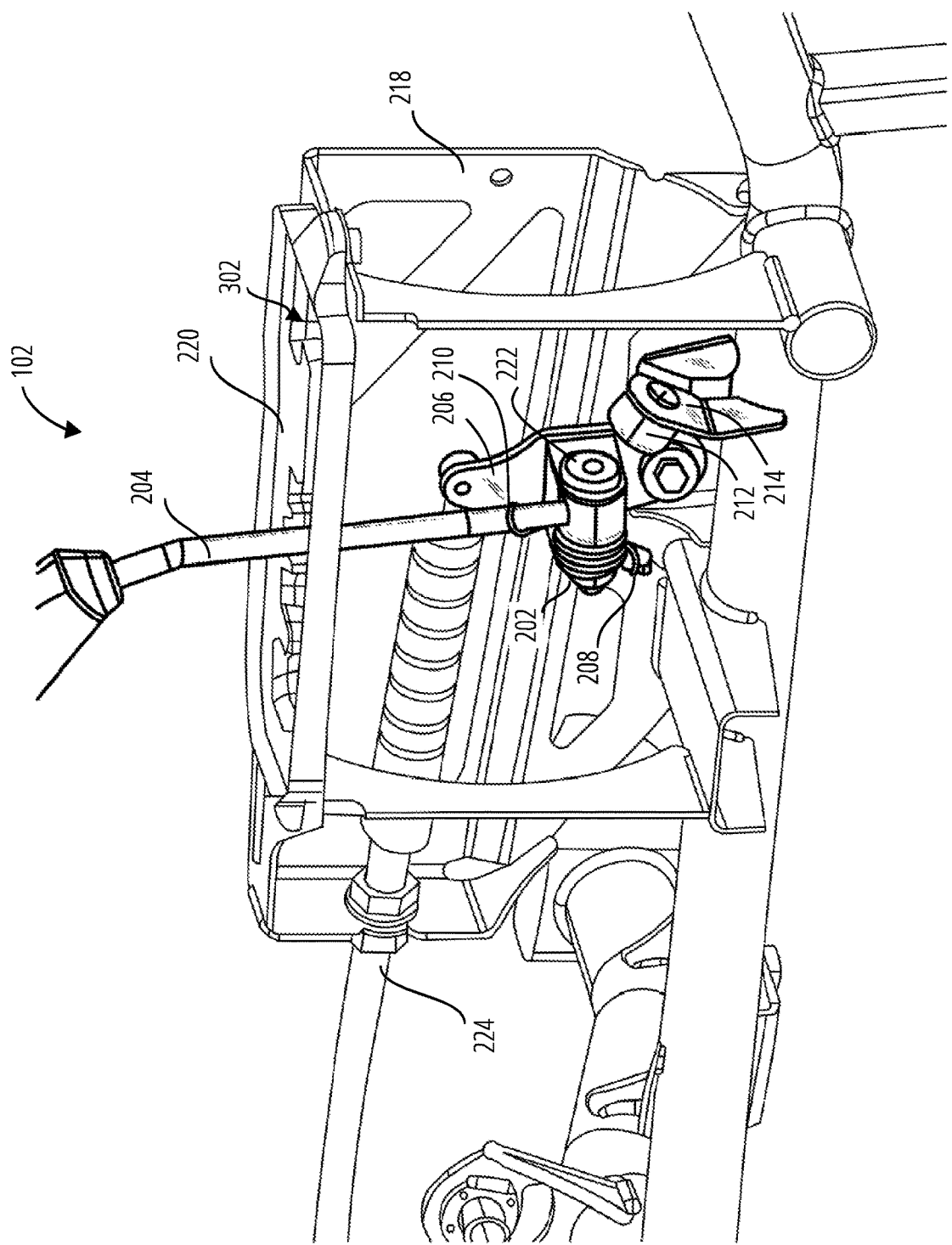
FIG. 3 illustrates a perspective view of a shift lever assembly 102 in accordance with one embodiment.

FIG. 1 illustrates a vehicle 100 in accordance with one embodiment. The vehicle 100 is shown as an off-road vehicle. However, vehicles in accordance with alternative embodiments can comprise any variety of vehicles, including automobiles, trucks, vans, recreational vehicles, utility vehicles, agricultural equipment, or construction equipment, for example. The vehicle 100 comprises a shift lever assembly 102 coupled to a gear shift lever 104 and a transmission 106, shown schematically in FIG. 1.

FIG. 2 through FIG. 5 illustrate a shift lever assembly 102 in accordance with one embodiment. The shift lever assembly 102 comprises a spring 202 coupled to bias a shift lever 204 mounted on a backplate 206. The backplate 206 is mounted at an attachment area to a mounting frame 218 with a bolt 216. In operation, the backplate 206 is also coupled to the shift cable 224 at an attachment area 226. The shift cable 224 engages the transmission system to effect gear changes.

A shift gate plate 220, comprising detents to retain the shift lever 204 in various positions, is attached to the mounting frame 218. For example, the shift gate plate 220 may have detents to retain the shift lever 204 in park, neutral, reverse, drive and low gear positions. The shift gate plate 220 includes a hooked gate detent 302, shown most clearly in FIGS. 3 and 4, formed to improve retention of the shift lever 204 at that position of the shift gate plate 220. The shift lever assembly 102 may be specifically designed to improve retention and feel of the shift lever 204 at the hooked gate detent 302 (e.g., parked) position of the shift gate plate 220.

The spring 202 includes a first spring end 208 coupled to the backplate 206, and a second spring end 210 coupled to and biasing the shift lever 204. When the shift lever 204 is in the hooked gate detent 302, a backing plate contact area 222 engages a bumper 212 that is secured to the mounting frame 218 by a retainer 214. In one embodiment, the backing plate contact area 222 may be a head of a bolt attached to the backplate 206. It will also be understood that the backing plate contact area 222 may be formed as part of the backplate 206 itself or a separate part attached to the backplate 206.

The retainer 214 may be plastic or metal and is configured with some flexibility (semi-rigid) to bias the shift lever 204 in a direction complementary (perpendicular) to the bias provided by the spring 202 (e.g., rearward vs leftward), but not so rigid that the operation of the shift lever 204 by a driver is substantially impaired. One embodiment of the retainer 214 may be formed of a metal material and the retainer 214 may have two legs that may each be welded to the mounting frame 218. The legs may be formed of flat strips and the retainer 214 may be configured such that the legs are not coplanar when attached to the mounting frame 218 to increase the rigidity of the retainer 214. The legs may come together at an area where the bumper 212 is attached. The retainer 214 may include an opening for receiving a portion of the bumper 212 for holding the bumper 212 on the retainer 214. Alternatively, the bumper 212 may be attached to the retainer 214 using one or more fasteners, or adhesives.

The biasing of the shift lever 204 provided by the spring 202, and the bias of the bumper 212 and the retainer 214, interact cooperatively to impart to the shift lever 204 a tendency laterally (e.g., leftward) and rearward relative to the hooked gate detent 302 of the shift gate plate 220. Example materials for the bumper 212 include rubber, metal, or plastic.

The retainer 214 attaches to the mounting frame 218 and supports the bumper 212. The retainer 214 provides a semi-rigid buttress structure with some flexibility, although most of the cushioning/biasing effect to the shift lever 204 by the bumper 212/retainer 214 combination may be provided by elasticity of the bumper 212. One embodiment of the bumper 212 may be formed of a rubber material that may be hollow or cup-shaped to provide a suitable amount of flexibility so that when the contact area 222 contacts the bumper 212, the bumper 212 is allowed to resiliently deflect.

Figure 4:
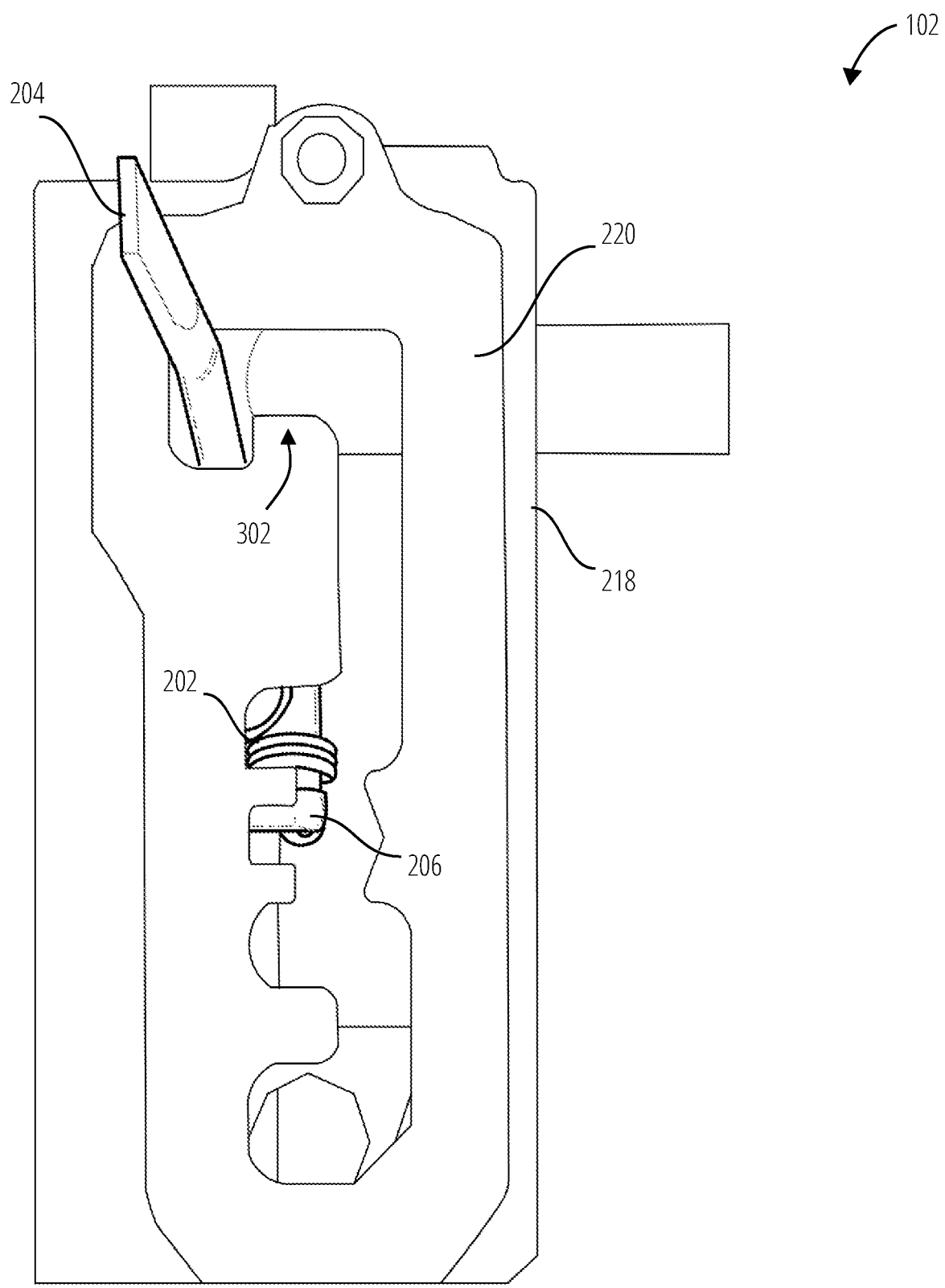
FIG. 4 illustrates a top view of a shift lever assembly 102 in accordance with one embodiment.

In the illustrated embodiment, the spring 202 provides a bias in the lateral (leftward) direction of the hooked gate detent 302 (toward the left in FIG. 4). The bumper 212 provides a rearward bias to keep the shift lever 204 in the hooked gate detent 302 (downward in FIG. 4).

Figure 5:
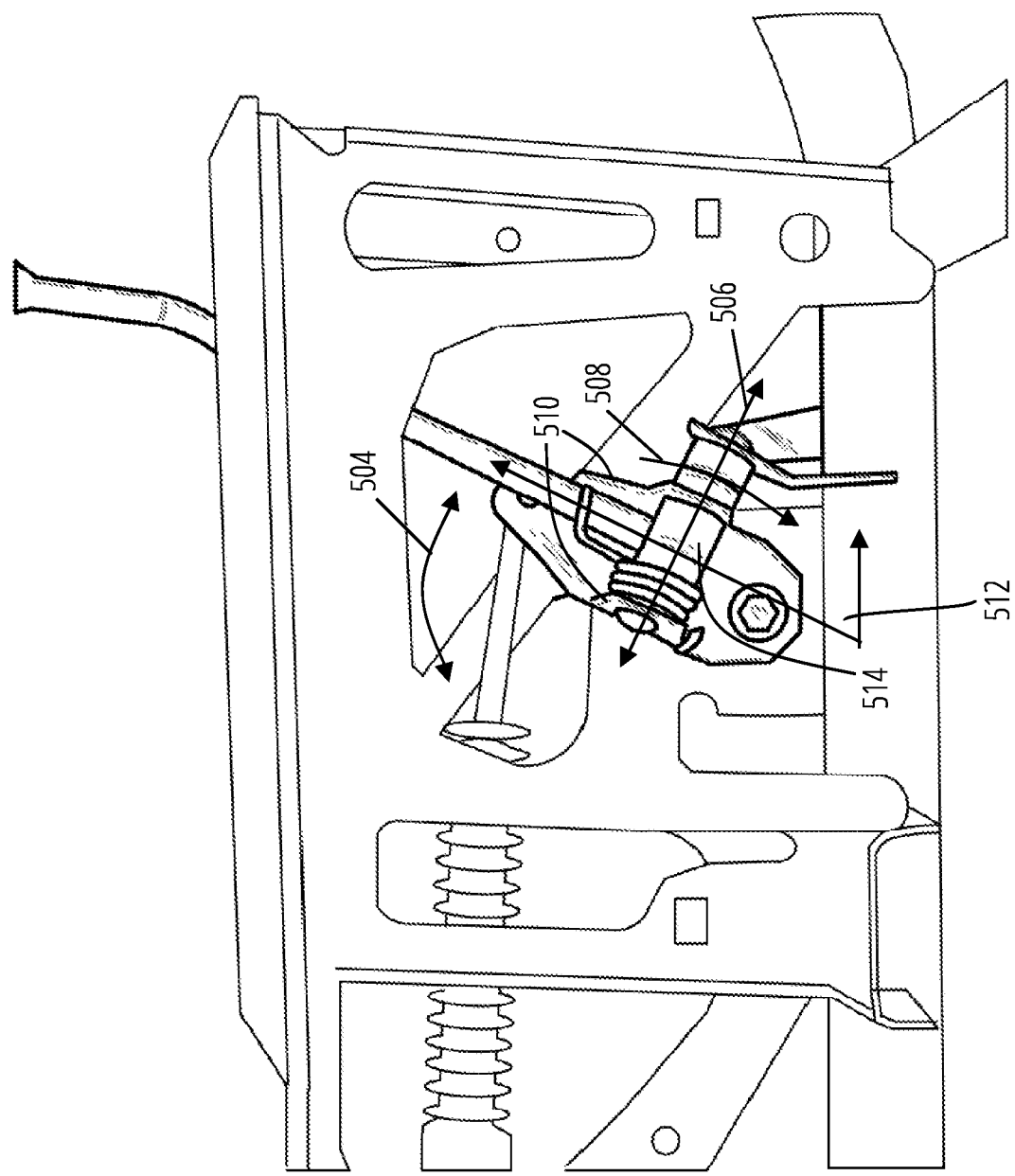
FIG. 5 illustrates a side view elaborating dynamics of a shift lever assembly 102 in accordance with one embodiment.

As shown in FIG. 5, the gear shift lever 104 is coupled to or formed into an endpiece 514, retained in a bracket 510 of the backplate 206. The endpiece 514 may have a circular cross section (other shapes capable of being rotated within the retaining bracket 510 are also possible, e.g., oval cross sections).

To change gears, particularly to and from the gear position associated with the hooked gate detent 302 (e.g., Park), the gear shift lever 104 is moved through a motion path 504 that generates both a rotation of the endpiece 514 about the rotation axis 506, and angular translation of the endpiece 514.

The following describes dynamics of the gear shift lever 104 as it is moved out of the hooked gate detent 302 to a different gear position. When positioned in the hooked gate detent 302, the gear shift lever 104 will typically be at or near an engagement angle 512. As the gear shift lever 104 is moved frontward (180 degree opposite direction of the rearward direction) to disengage from the slot of the hooked gate detent 302, the endpiece 514 undergoes an angular translation along the path 508. Further resistance to the frontward motion of the gear shift lever 104 is generated by resilience of the retainer 214. As the gear shift lever 104 moves laterally through the hooked gate detent 302, the endpiece 514 rotates about the rotation axis 506. The spring 202 provides resistance to the lateral motion of the gear shift lever 104 through and out from the hooked gate detent 302.

The following describes dynamics of the gear shift lever 104 as it is moved into the hooked gate detent 302 from a different gear position. The gear shift lever 104 moves through the motion path 504 causing angular translation of the endpiece 514 (and possibly some additional rotation of the endpiece 514) until the backing plate contact area 222 engages with the bumper 212. This engagement occurs as the gear shift lever 104 is moved near or into the hooked gate detent 302. Lateral (e.g., leftward) movement of the gear shift lever 104 into the hooked gate detent 302 is facilitated by the urging of the spring 202 in the lateral direction into the hooked gate detent 302. The gear shift lever 104 is also urged into the slot of the hooked gate detent 302 by force in the rearward direction generated by the bumper 212 contacting and pushing back (rearward) against the backing plate contact area 222.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A gear shift lever biasing apparatus, comprising:
   a backing plate coupled to an endpiece of a gear shift lever and biasing the gear shift lever with a spring primarily along a first dimension axis, the backing plate having a contact area and a bracket, the endpiece rotationally mounted in the bracket with a bolt, the bolt forming the contact area; and
   a bumper separate from the backing plate to engage the contact area and to bias the gear shift lever primarily along a second dimension axis that is substantially orthogonal to the first dimension axis.

2. The apparatus of claim 1, wherein a first end of the spring is tension fit to the backing plate and a second end of the spring is tension fit to the gear shift lever.

3. The apparatus of claim 1, further comprising:
   the backing plate comprising an attachment area for a gear shift cable.

4. The apparatus of claim 1, further comprising:
   the backing plate comprising an attachment area for rotational mounting to a vehicle frame.

5. The apparatus of claim 1, wherein the first dimension axis is a lateral direction in a hook shaped detent in a shift gate, and the second dimension axis is a rearward direction in the hook shaped detent.

6. The apparatus of claim 1, further comprising a retainer for securing the bumper to a frame.

7. The apparatus of claim 6, wherein the retainer comprises two legs for attachment to the frame, and wherein the two legs come together at an area where the bumper is attached.

8. The apparatus of claim 7, wherein the legs are formed of flat strips having portions that are attachable to the frame to define two planes that are not coplanar.

9. The apparatus of claim 1, wherein the endpiece is rotatable about a rotation axis, and wherein the bumper is formed of an elastic material having a longitudinal axis that extends along the rotation axis when the gear shift lever is in the particular gated position, such that when the contact area engages the bumper, the bumper resiliently compresses to thereby bias the gear shift lever along the second dimension axis.

* * * * *